United States Patent [19]

Baudin et al.

[11] 4,362,587

[45] Dec. 7, 1982

[54] PROCESS OF FORMING A MULTI-PLY LAMINATE

[75] Inventors: Pol Baudin, Fontaine l'Eveque; Pierre Collignon; Claude Gillieaux, both of Charleroi, all of Belgium

[73] Assignee: BFG Glassgroup, Paris, France

[21] Appl. No.: 209,972

[22] Filed: Nov. 24, 1980

[30] Foreign Application Priority Data

Nov. 27, 1979 [GB] United Kingdom ............... 7940865

[51] Int. Cl.³ .......................................... B32B 31/00
[52] U.S. Cl. ................................... 156/87; 156/286; 156/104; 156/309.3
[58] Field of Search ............... 156/87, 286, 382, 285, 156/104

[56] References Cited

U.S. PATENT DOCUMENTS 4,180,426 12/1979 Oustin et al. ..................... 156/382
4,192,701 3/1980 Martin et al. ...................... 156/285

Primary Examiner—George F. Lesmes
Assistant Examiner—Beverly K. Johnson
Attorney, Agent, or Firm—Spencer & Kaye

[57] ABSTRACT

When forming a multi-ply laminate having at least one thermoplastic structural ply forming an outer ply of the laminate, known processes comprise degassing and bonding steps during which gas is removed from between assembled structural plies of the laminate and the plies are heated to cause them to bond together while a moulding plate is in contact with the or each exposed thermoplastic ply.

In order to reduce or eliminate optical distortion in the laminate, which may be adapted to constitute a vehicle windshield, during the degassing step, the assembled plies are subjected to a sub-atmospheric environmental pressure having an absolute valve of 150 mm Hg or less while the inter-ply space or spaces are subjected to a sub-atmospheric pressure at the edges of the assembly to degas the assembly, said edge pressure and said environmental pressure are maintained at such values as to give rise to a separation of the plies which is attributable to the mean inter-ply gas pressure being higher than the environmental pressure while the assembly of plies is heated to a temperature below that at which effective adherence commences between the thermoplastic material and an adjacent ply, the degassed assembly remains subject to sub-atmospheric edge pressure while its temperature is increased past the temperature at which said effective adherence commences and the assembly is then subjected to a bonding step in which heat and pressure conditions are such as to cause the plies to bond firmly together.

13 Claims, 5 Drawing Figures

PROCESS OF FORMING A MULTI-PLY LAMINATE

The present invention relates to a process of forming a multi-ply laminate which comprises at least one thermoplastic structural ply forming an outer ply of the laminate, said process comprising degassing and bonding steps during which gas is removed from between structural plies of the laminate and the plies are heated to cause them to bond together while a moulding plate is in contact with the or each exposed thermoplastic ply.

Products formed in accordance with the present invention are particularly intended for use as motor vehicle windshields. In such cases the product would be transparent and would normally consist of a single sheet of glass and a single sheet of plastic, and would be installed with the plastic directed to the interior of the vehicle. The purpose of the plastic as is by now well known is to bind glass fragments together in the event of an accident to the extent that the risk of injury to a driver or passenger by flying glass or contact with the windshield is minimised. It will be apparent that such a product should be as optically perfect as is consistent with a realistic sales price. The present invention is also useful in the manufacture or opaque products, for example mirrors. Such a mirror could for example be formed using a tinted plastic sheet or a tinted glass sheet so as to afford different reflective properties according to the side from which it is viewed. Again, the plastic sheet will retain fragments in the case of breakage.

The present invention is particularly concerned with laminated products having high and long-lasting optical quality.

Optical defects can arise from a number of causes. One major cause is imperfect assembly of the plies. This in turn can give rise to the entrapment of air between the plies. For this reason, the plies of the laminate are assembled and are then degassed prior to bonding. In order to assist in the degassing step, the or each thermoplastic ply may be given a figured surface. This may seem somewhat paradoxical, since irregularities in the thickness of one or more plies of the laminate is another major cause of optical defects. Nevertheless, it has been felt that the advantages given by such figuring in the degassing step may outweigh the disadvantages of using figured thermoplastic material. Considering an assembly for forming a two-ply laminate consisting of a vitreous ply and a thermoplastic ply, figuring may be applied to what will become the bonded face of the thermoplastic ply, to what will remain its exposed face, or to both such faces. When the figured face is in contact with a smooth surface of the vitreous ply, the figuring can be arranged to define pathways along which gases can escape easily during degassing of the assembly. So that the figuring shall not be apparent, or shall not be so apparent, in the finished laminate, a smooth glass moulding plate having the desired planeity or curvature is placed against the exposed face of the thermoplastic ply during the degassing and bonding steps. During bonding, the thermoplastic ply is pressed between the moulding plate and the vitreous ply so that the figuring disappears, and this in general will lead to a product of good initial optical quality. However, the stresses in the thermoplastic ply due to the ply's being pressed between the moulding plate and the vitreous ply are usually not totally relieved at the end of the bonding step, with the result that, over the course of a few months, the thermoplastic material further relaxes so that its exposed surface often becomes distorted. It is believed that this is due to the conditions under which the assembly is degassed and bonded.

It is an object of the present invention to provide a process which permits the production of laminates in which the appearance of such optical distortion is reduced and/or postponed and may even be eliminated.

According to the present invention there is provided a process of forming a multi-ply laminate which comprises at least one thermoplastic structural ply forming an outer ply of the laminate, said process comprising degassing and bonding steps during which gas is removed from between assembled structural plies of the laminate and the plies are heated to cause them to bond together while a moulding plate is in contact with the or each exposed thermoplastic ply, characterised in that during the degassing step, the assembled plies are subjected to a sub-atmospheric environmental pressure having an absolute value of 150 mm Hg or less while the inter-ply space or spaces is or are subjected to a sub-atmospheric pressure at the edges of the assembly (hereinafter called "edge pressure") to degas the assembly, said edge pressure and said environmental pressure being maintained at such values as to give rise to a separation of the plies of the assembly which is attributable to the mean inter-ply gas pressure being higher than the environmental pressure while the assembly of plies is heated to a temperature below that at which effective adherence commences between the thermoplastic material and a said adjacent ply, in that the degassed assembly remains subject to sub-atmospheric edge pressure while its temperature is increased past the temperature at which said effective adherence commences and in that the assembly is then subjected to a bonding step in which heat and pressure conditions are such as to cause the plies to bond firmly together.

It has been found that by operating in accordance with the invention, a better degassing of the assembly can be achieved than with previously known degassing techniques and this in turn leads to the formation of a better bond between the or each thermoplastic ply and its adjacent ply or plies. This is believed to be due in part to the fact that the assembly is heated while it is subjected to an environmental sub-atmospheric pressure of 150 mm Hg or less and to a sub-atmospheric edge pressure so that not only is air in the inter-ply space or spaces removed during degassing, but also, gas adsorbed in one or more of the structural plies is liberated and removed.

The subjection of the assembly to said sub-atmospheric pressures may commence before or after the commencement of heating, (or of course heating and subjection to sub-atmospheric pressure may commence simultaneously) provided that there is a sufficient time interval during which the assembly is both heated and subjected to said sub-atmospheric pressures so that degassing can take place.

When the plies are assembled, it is possible that a said thermoplastic ply may be unevenly tensioned over its area, and it is by no means impossible for such a ply to be in tension in one portion and in compression in another in the assembly. If the edge pressure is such that the mean inter-ply gas pressure is greater than the environmental pressure so that ply separation occurs, the or each thermoplastic ply can float between its adjacent plies or between its adjacent ply and the moulding plate.

The flotation of the thermoplastic ply between its adjacent surfaces which is permitted by operating in accordance with the invention enables the ply to relax so that the possibility of the thermoplastic ply being bonded while it is unevenly stressed is reduced and consequently, in the bonded laminate, the exposed thermoplastic ply or plies will be less susceptible to cold flow so that any optical irregularities due to such stresses will also be reduced.

A further advantage is as follows. It is clear that for efficient degassing of the assembly, it is necessary that the gases should be able to circulate between the plies so that they can be sucked off at the edges of the assembly. It has hitherto been thought necessary to make use of thermoplastic sheets having a figured surface as has been referred to, so that gases can be sucked off along pathways formed by the figuring. Thus, figured thermoplastic plies may be used in a process according to the invention, but because the plies become separated during degassing it is also possible, and indeed it is preferable, to use one or more smooth, that is, unfigured, thermoplastic plies. In this way, any possibility that the figuring of a said thermoplastic ply could reappear during aging of the panel is eliminated.

For the best results reduced pressure acting on the edges of the assembly should be maintained for at least 10 minutes.

In order to reduce the time taken for degassing it is preferred that the commencement of heating of the assembly should be immediately followed by its subjection to edge and environmental sub-atmospheric pressures. This can be achieved easily be placing the assembly in a heated treatment chamber which is then closed and evacuated to the desired pressure.

The amount of adsorbed gas which is liberated from the plies of the assembly will depend inter alia on the temperature to which the assembly is subjected during degassing, and it is accordingly desirable that that temperature should be close to the temperature at which the thermoplastics material softens sufficiently to commence effective bonding.

It is however essential that the thermoplastic material should not be heated too strongly during the degassing step, since it that were to happen it is likely that premature bonding would take place so that the thermoplastic ply would be unable properly to relax, and further degassing would be hindered or even prevented. The temperature at which effective adhesion will commence between a thermoplastic ply and an adjacent sheet is dependent on a large number of factors. Among these factors may be cited the following:
 (i) the nature of the thermoplastic ply;
 (ii) the nature of the adjacent sheet;
 (iii) whether or not an adhesion promoting primer is used;
 (iv) any other surface treatment.

Accordingly, we propose a test, based on ASTM D 903-49, for determining the temperature at which effective bonding commences. A strip of the material for forming the exposed thermoplastic ply is cut to 4 cm in width. The thermoplastic material is applied to a sheet for forming the adjacent ply of the laminate, and a moulding plate is placed in contact with the other face of the thermoplastic ply. This assembly is then subjected to the temperature and pressure schedules of the degassing stage of the invention. After degassing and before any further temperature increase, the test specimen is removed. A light or ineffective bond may have developed between the thermoplastic ply and the adjacent structural ply. The assembly is placed on a support beneath a pair of rollers, and an end of the thermoplastic strip is taken up between the rollers and secured in the jaws of the testing machine. The strip is then peeled away from the structural ply against one of the rollers and at an angle of 90° to the structural ply. This roller has a diameter of 28 mm. For the purpose of this specification, effective bonding is considered to commence at a peel strength of 25 g/cm.

The amount of gas which is removed from between the plies of the assembly will depend inter alia on the absolute pressure(s) to which the assembly is subjected during the degassing step. While good results can be achieved by subjecting the assembly to a said sub-atmospheric environmental pressure which is 150 mm Hg or less while the assembly is heated to a temperature below that at which the thermoplastic material commences to adhere to a said adjacent ply, better results can be achieved more rapidly when said pressure is or is reduced to an absolute value of 100 mm Hg or less during the degassing step. Even better results can be achieved when said sub-atmospheric environmental pressure is or is reduced to an absolute value of 30 mm Hg or less while the assembly is heated to a temperature below that at which the thermoplastic material commences to adhere to a said adjacent ply, and for the best results, said environmental pressure is or is reduced to an absolute value of 10 mm Hg or less during such heating.

In the most preferred embodiments of the invention, said sub-atmospheric edge pressure and said sub-atmospheric environmental pressure are, or are reduced to, an absolute value of 10 mm Hg or less during such heating.

Advantageously, before firm bonding takes place, said environmental pressure is released while said edge pressure remains at a sub-atmospheric level. If the edge pressure were released at the same time as, or before, release of environmental pressure, it is possible that under come circumstances air could re-penetrate the edges of the assembly which is undesirable since bubbles might be formed in the edges of the finished laminate.

If such environmental pressure release takes place at a suitable temperature, especially if it takes place abruptly, it can initiate bonding. Accordingly, it is preferred that said environmental pressure is released when the temperature of the assembly is within 10° C. and preferably within 5° C. of the temperature at which effective bonding commences.

Preferably said edge pressure is released while the temperature of the assembly is still increasing.

Advantageously, in said bonding step, said assembly is heated to a maximum temperature of between 20° C. and 80° C. above the temperature at which effective bonding commences.

In some preferred embodiments of the invention, said assembly is maintained at within 5° C. of its maximum temperature for at least 5 minutes, and in some preferred embodiments of the invention, said assembly is maintained at such a temperature for at least 20 minutes. Each of these features contributes to the formation of a good bond and allows some degree of stress relaxation in the thermoplastic material. The maximum temperature which that material can tolerate without discolouration will clearly depend on the actual material used, and in general increasing the plasticiser content of the thermoplastic material will reduce its tolerance of high temperatures. Maintaining the temperature of the assembly at such a level for at least 20 minutes is particularly important when figured thermoplastic sheets are used.

In general, by operating in accordance with a process as defined above, it is found that the laminate produced is sufficiently firmly bonded together without any further treatment. In some cases however it may be desirable that the main faces of said assembly are subjected to a super-atmospheric environmental pressure in a subsequent stage.

It will be appreciated that any thermoplastic layer in the laminate may be formed by two or more plies of the same thermoplastic material. It will also be appreciated that plies of different thermoplastic materials may be present in a laminate produced in accordance with the invention. When different thermoplastic materials are present, the temperature at which effective bonding commences should be taken as the lower or lowest temperature at which effective bonding commences between two adjacent plies of the assembly.

In some embodiments of the invention, the laminate consists of two or more thermoplastic plies, but preferably at least one said ply is constituted by a vitreous sheet. This provides a product having a more abrasion resistant surface.

Preferably the or each said vitreous sheet is coated, prior to assembly, with a primer which promotes its adhesion to an adjacent thermoplastic ply, for example a silicon organo-functional silane. The primer actually used may be a mixture of silanes so that the degree of adherence may be controlled for special purposes if this is desired.

It is necessary that the or each moulding plate should have a smooth surface and that it should be non-adherent to the exposed thermoplastic layer. In order to promote this, some preferred embodiments of the invention provide that said moulding plate is a glass sheet coated with a substance which inhibits adhesion between that sheet and the thermoplastic layer, for example a silicon-functional silane.

In an alternative arrangement, said moulding plate is constituted as part of a wall of an envelope in which the assembly to be bonded is inserted so that the edges of the assembly and its main faces can be subjected to different sub-atmospheric pressures. Such an envelope may be of a silicone resin, and its moulding portion may be made sufficiently thick to achieve the desired result.

The use of such a moulding envelope has particular advantages when the invention is used in the manufacture of curved laminates for example for vehicle windshields. In fact in vehicle windshield manufacture, the degree of reproducibility of curvature imparted by commercially used bending processes is not high. Of course the reproducibility is sufficient for windshields intended for a particular vehicle model to be actually fitted to a vehicle of that model, but the curvature is not identical as between successively curved sheets. This is why for example in the case of a conventional glass-plastics-glass windshield, the two glass sheets for that windshield are bent to the required curvature as one. In fact if one of those sheets is broken or otherwise damaged, it is normal practice to discard the other sheet as well. When operating in accordance with the present invention and using a glass moulding plate in the bonding of a curved laminate including a glass structural ply, the best results are achieved if the moulding plate and the or each glass structural ply are bent to the required curvature as one. The glass moulding plate may be discarded after its first use. This apparent wastage can be overcome by using a moulding plate of synthetic plastic material, for example constituted as part of a wall of a degassing envelope, which plastic material is sufficiently hard to have the desired moulding effect while being sufficiently flexible to accommodate all tolerable variations in curvature of the laminate assembly.

Various thermoplastic materials may be used in the performance of the present invention.

Among those which are especially preferred for use are the following:
1. Polyvinyl chloride
   (a) rigid type polyvinyl chloride, for example:
   rigid polyvinyl chlorides furnished by Solvay
   rigid polyvinyl chloride furnished by Soc. Ital. Resina
   DURAPLEX* (furnished by Duraplex Plastics Ltd)
   BETAGLASS* (furnished by Aerotherm)
   VINYCLAIR* (furnished by La Cellophane)
   (b) Plasticised polyvinyl chloride, for example:
   plasticised polyvinyl chlorides furnished by Solvay
   ASTRAGLAS* (furnished by Dynamit Nobel)
   ALKORFAN* (furnished by Alkorwerke Lissmann)
2. Polyurethanes, for example:
   polyurethanes furnished by Bayer
   TUFTANE* (furnished by B. F. Goodrich Cy.)
3. Polyvinylbutyral, for example:
   SAFLEX* (furnished by Monsanto)
4. Polyvinyl fluoride, for example:
   TEDLAR* (furnished by Du Pont)
5. Polycarbonate, for example:
   MAKROLON* (furnished by Bayer)
6. Polyethylene terphthalate, for example:
   MYLAR* (furnished by Du Pont)
7. Polyamide, for example:
   TROGAMID* (furnished by Dynamit Nobel)
* Trade Marks Preferred ways of putting the present invention into effect will now be described with reference to the accompanying diagrammatic drawings, in which:

Figure 3:
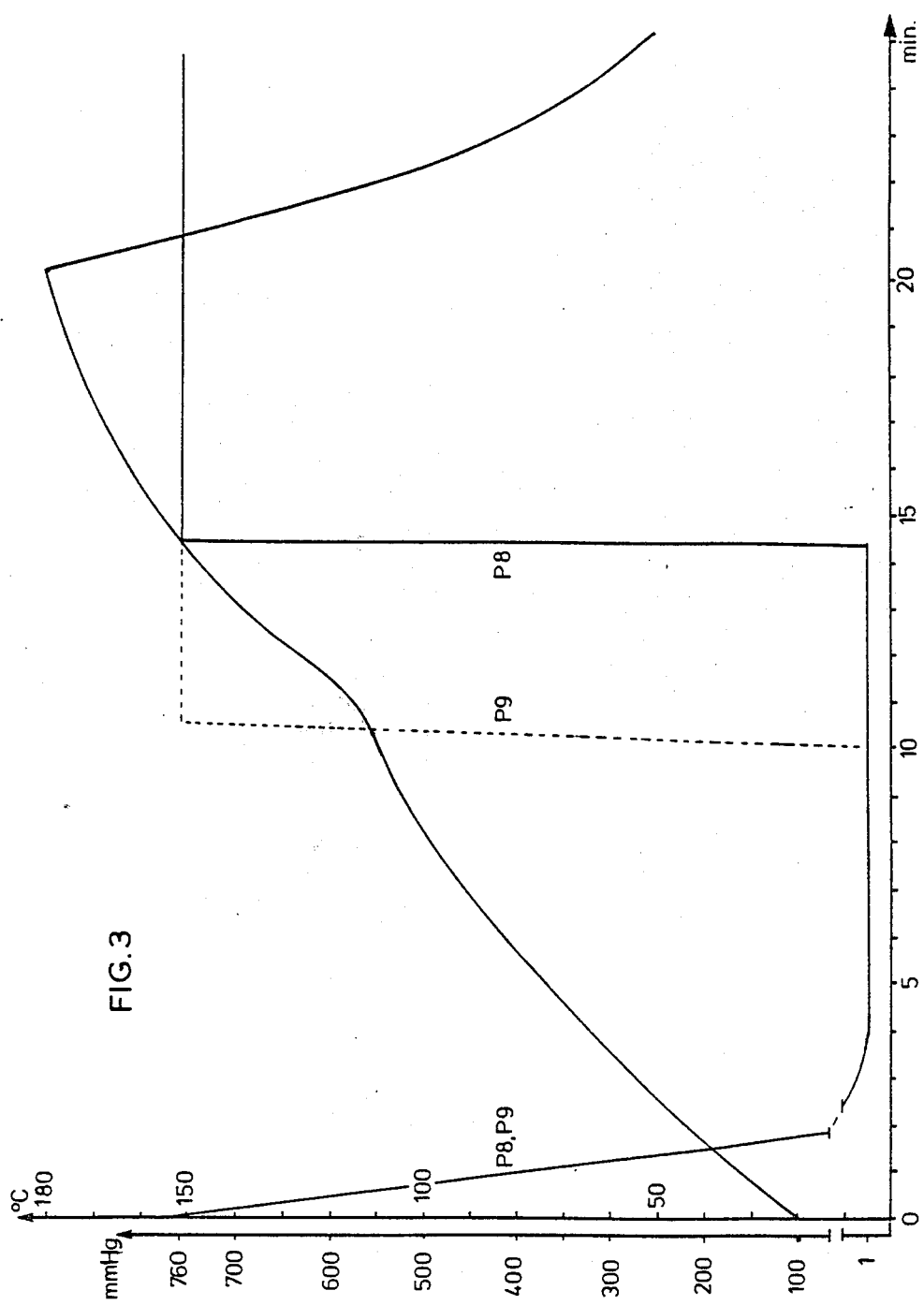
Figure 4:
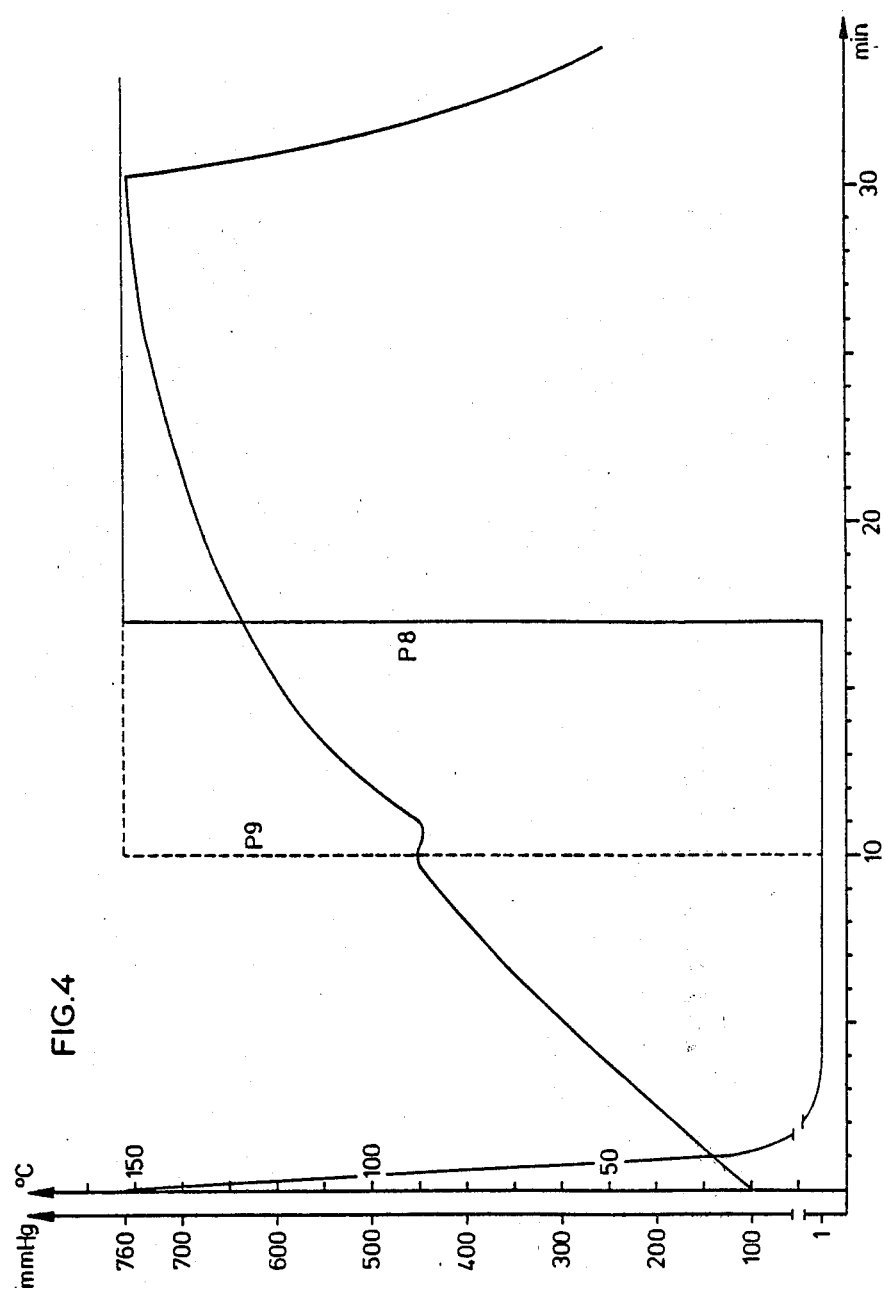
Figure 5:
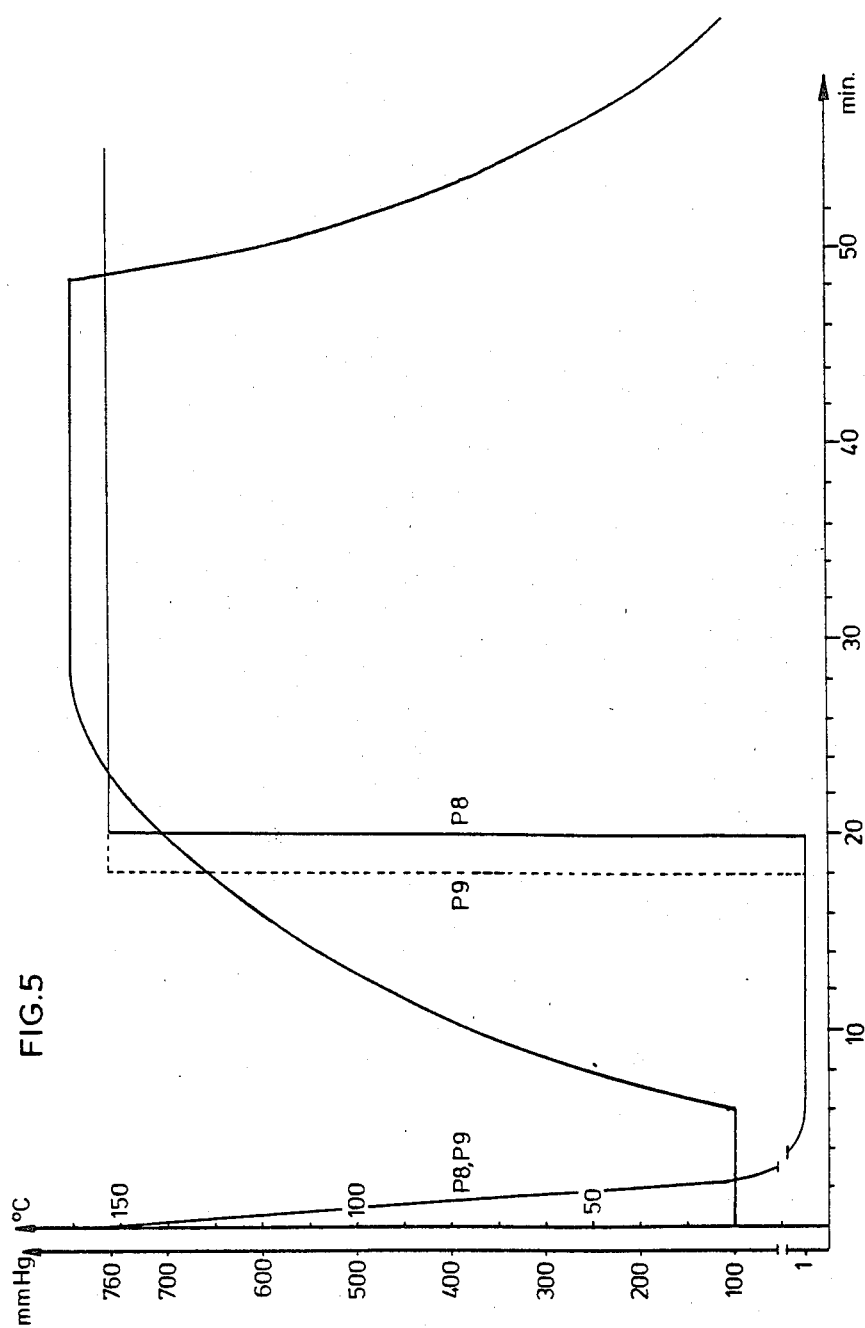

FIGS. 3 to 5 each illustrate a specific pressure-temperature schedule to which an assembly may be subjected in the performance of the invention.

Figure 1:
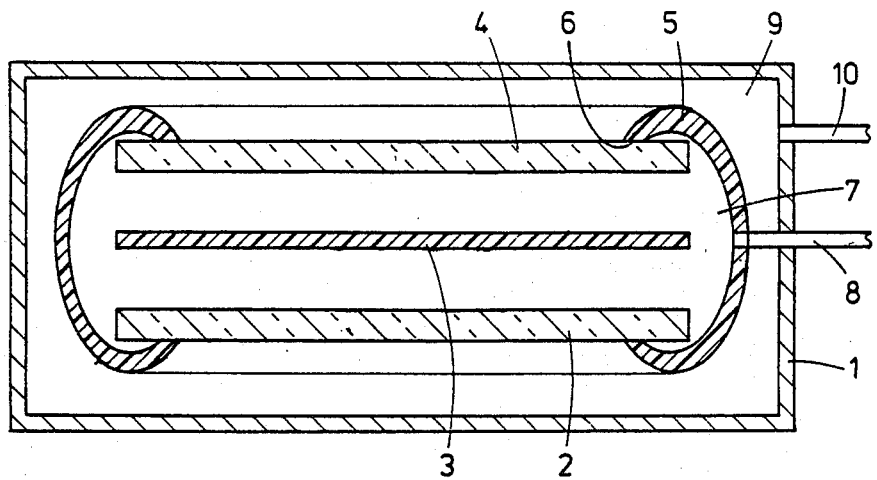
FIG. 1 is a view of a first embodiment of apparatus for use in performing the present invention.

FIG. 1 shows an autoclave 1 in which is located an assembly comprising a vitreous structural ply 2 and a thermoplastic structural ply 3 which are to be bonded together to form a laminate of which the thermoplastic ply 3 forms an outer ply. It will be appreciated that any desired number of alternate thermoplastic and vitreous plies may be interposed between the two plies 2, 3 shown in the drawing. It will also be appreciated that the vitreous ply 2 or any or all of the optional further vitreous plies may be replaced by a rigid thermoplastic ply. A moulding plate 4, here shown of glass is placed in contact with the exposed thermoplastic ply 3 of the assembly. The structural plies 2, 3 and the moulding plate 4 are shown spaced apart for convenience. An endless tube 5 of elastomeric material is slit to define endless lips 6 which are placed in contact with the margins of the outer faces of the vitreous structural ply 2 and the moulding plate 4 so as to define a space 7 around the edges of the assembly 2, 3. This space 7 can be evacuated by a pump not shown connected via a conduit 8 to the edge tube 5. The interior 9 of the autoclave 1 is connected to a pump via a conduit 10. The autoclave is provided with heating means (not shown).

EXAMPLE 1

In a specific practical embodiment, the thermoplastic material which forms the ply 3 is a plasticised polyvinyl chloride available from Dynamit Nobel under their trade name ASTRAGLAS. The temperature at which effective bonding commences between this material and the vitreous structural ply under the conditions of degassing to be specified is about 110° C.

The ply 3 of "ASTRAGLAS" (Trade Mark) is 1 mm in thickness and is to be bonded to a 3 mm thick sheet 2 of float glass. As has been mentioned, the strength of a bond between a plastic ply and a glass sheet depends inter alia on any surface treatment to which the glass has been subjected. As is well known, during the manufacture of float glass, one side of the glass is in contact with a bath of molten metal, usually tin, while the other side (which we call the air side) is in contact with the atmosphere above the bath in the float chamber. The thermoplastic ply is to be bonded to the air side of the glass sheet. Prior to assembly, the air side of the glass sheet is sprayed with a primer solution containing 10% by weight of plasticised polyvinyl chloride and 0.2% by weight of a mixture of aminosilane and chlorosilane dissolved in a mixture of dichloroethylene and cyclohexanone.

The plies 2, 3 of the laminate are assembled and the moulding plate 4 is positioned, the endless tube 5 is applied, and the whole is introduced into the autoclave 1. The moulding plate 4 is of float glass whose air side is treated with dimethyl-dichlorosilane and placed in contact with the thermoplastic ply.

The temperature within the autoclave is maintained at about 200° C.

On being introduced into the autoclave 1, the assembly 2, 3 and the moulding plate 4 are immediately heated. The autoclave 1 is sealed and its interior 9 is evacuated via conduit 10 to create an environmental pressure $P_9$ within the autoclave which is at most 150 mm Hg. FIG. 3 shows the temperature and pressure schedule for the specific practical embodiment under consideration. The environmental pressure $P_9$ is reduced to about 1 mm Hg in about two minutes after the autoclave is sealed. At the same time, the space 7 around the edges of the assembly 2, 3 is evacuated via conduit 8 to create an edge pressure $P_7$ of a value such as to give rise to a separation of the plies 2, 3 of the assembly which is attributable to the mean inter-ply pressure being higher than the environmental pressure. As will be appreciated it is difficult in practice to measure such inter-ply pressure, and it is also difficult to measure the edge pressure $P_7$ accurately. What is in fact monitored is the pressure $P_8$ in the conduit 8 outside the autoclave 1. It will be appreciated that the mean inter-ply pressure must be higher than the mean edge pressure $P_7$ which in turn must be higher than the conduit pressure $P_8$ if there is to be any flow of gas from between the plies 2, 3 along the conduit 8: this is of course necessary for degasification of the inter-ply space to take place. It will therefore be noted that under some conditions, the monitored conduit pressure $P_8$ can in fact be lower than the environmental pressure $P_9$ while the inter-ply pressure is higher than the environmental pressure as is necessary for ply separation to take place.

In the embodiment under consideration, the edge tube 5 is evacuated to a conduit pressure of 1 mm Hg in about two minutes after the autoclave is sealed.

When the temperature of the assembly has been increased to about 110° C., the temperature at which effective bonding commences between the plies 2, 3 of the assembly, the sub-atmospheric environmental pressure $P_9$ within the autoclave is released, so that the pressure $P_9$ returns to atmospheric.

This release, which may last about half a minute, takes place between ten and fifteen minutes after sealing of the autoclave. It is at this stage that the assembly may be removed from the autoclave during testing to ascertain whether or not effective bonding corresponding to a peel strength of 25 g/cm has commenced. A short time, say four or five minutes, after the environmental pressure $P_9$ is released, the edge pressure $P_7$ is also allowed to return to atmospheric. By this stage, the assembly being bonded has been further heated so that its temperature is about 150° C. After the edge and environmental pressures have been returned to atmospheric, the assembly continues to be heated for a further five minutes or so until its temperature reaches 180° C. This ensures firm bonding of the assembly. The bonded laminate is then allowed to cool and the moulding plate is removed.

The fact that during degassing, the assembly 2, 3 is subjected to a sub-atmospheric edge pressure and a sub-atmospheric environmental pressure whose relative values give rise to ply separation at the same time as the assembly is at an elevated temperature but which is below the temperature at which effective bonding commences gives rise to a number of important advantages. The elevated temperature allows a larger quantity of gas absorbed by the thermoplastic ply to be drawn off. The plies 2, 3 do not effectively adhere together so that degassing is not hindered by premature bonding of the plies. The thermoplastic ply 3 can float in the escaping gas currents so that residual stresses therein (due, for example, to imperfect laying up of the plies 2, 3) can relax prior to bonding of the plies. The ply separation also enables the interply space to be degassed very easily. This last is very important, since it enables the use of a figured thermoplastic ply to be dispensed with and a smooth, non-figured ply to be used.

It has hitherto been thought necessary to use a figured thermoplastics ply in order to give pathways for the gas to escape from between the plies.

When the finished laminate is subjected to the adherence test herein specified, a peel strength of 0.5 to 1.0 kg/cm is found depending on the relative proportions of aminosilane and chlorosilane used.

In a variant, the moulding plate 4 is of a hard synthetic plastic material.

EXAMPLE 2

A 0.6 mm thick film 3 is formed from polyurethane supplied by Bayer and is to be bonded to the air side of a 3 mm thick float glass sheet 2. To promote adhesion between the plies 2, 3, one face of the polyurethane is coated with a solution of aminosilane in isopropyl alcohol. The air face of a float glass moulding plate treated with dimethyl dichlorosilane is placed against the thermoplastic sheet.

The assembly 2, 3, the moulding plate 4 and edge tube 5 are placed in an autoclave 1 and the assembly is subjected to the pressure-temperature schedule given in FIG. 4. The edge tube conduit and environmental pressures $P_8$, $P_9$ are both reduced to about 1 mm Hg in about two minutes while the assembly is heated. When the assembly reaches 90° C., at which temperature effective bonding between the polyurethane and the glass sheet 2 commences, the environmental pressure $P_9$ is returned to atmospheric. This happens about ten minutes after the assembly is introduced into the autoclave. The low sub-atmospheric edge pressure is maintained for a further seven minutes, when the temperature of the assembly is about 125° C. The edge pressure is then returned to atmospheric. The assembly meanwhile continues to be heated until its temperature reaches about 150° C. after a further thirteen minutes. The bonded assembly is then allowed to cool and the moulding plate is removed.

The adherence of the finished laminate depends upon the amount of primer silane used. When the laminate is tested as specified, peel strength values of between 1.75 and 7.5 kg/cm can be achieved.

In a modification, the assembly is maintained at its maximum temperature of about 150° C. for a period of about ten minutes before cooling is allowed to commence.

In a variant of this Example, the primer used is a solution of epoxy silane in isopropyl alcohol.

EXAMPLE 3

In a variant of Example 2, the glass sheet 2 is replaced by a preformed laminate consisting of a polyurethane interlayer 0.6 mm thick bonding together a pair of glass sheets respectively 2.6 mm and 1.5 mm in thickness. A polyurethane film is bonded by the process described in Example 2 to the thinner of these two glass sheets.

The glass-polyurethane-glass preformed laminate is made by a classical process.

In a variant of this Example, the preformed laminate specified is replaced by other preformed laminates.

EXAMPLE 4

A three ply assembly is to be bonded together to form a laminate. A 3 mm sheet of float glass is taken and its air side is primed with a 0.1% solution of aminosilane in chlorothene (I, I, I trichloroethane) (proportion by volume). A 0.4 mm thick film of plasticised polyvinyl chloride is laid up on top of a 0.72 mm thick film of a copolymer of polyvinyl chloride and glycidyl methacrylate previously laid up on the primed glass sheet. The air side of a float glass moulding plate, coated with dimethyl dichlorosilane as adherence inhibitor is applied to the exposed face of the polyvinyl chloride film and the whole is treated in an autoclave according to the pressure-temperature schedule illustrated in FIG. 5.

As will be seen from FIG. 5, the environmental and edge tube conduit pressures $P_9$ and $P_8$ are both reduced to about 1 mm Hg about five minutes after the assembly has been placed in the autoclave. The autoclave is initially at room temperature, and the assembly is not heated until after such low pressures have been reached. After six minutes then, the temperature of the assembly begins to rise. After a further twelve minutes, the temperature of the assembly has reached 130° C. (the temperature at which effective bonding of the plasticised polyvinyl-chloride film commences) and the environmental pressure $P_9$ is then returned to atmospheric. About two minutes later, when the assembly has reached 140° C, the edge pressure is returned to atmospheric. The temperature of the assembly is further increased to about 160° C.; this takes about eight minutes, and the assembly is maintained at this maximum temperature for a further twenty minutes, whereafter the bonded assembly is allowed to cool.

An adherence between the glass and the thermoplastics material of the order of 1.0 kg/cm peel strength is achieved.

EXAMPLE 5

A p.v.c layer 1.5 mm thick was bonded to a tempered glass sheet 3.5 mm thick by a process as described with reference to FIG. 1 to form a vehicle windshield. The tempered glass sheet was pre-coated with a solution containing 10% by weight of polyvinyl-chloride dissolved in a solvent formed by equal volumes of dichloroethylene and dimethylformamide to which was added silicon organo-functional amino silane in an amount between 0.5% and 5% by weight of the dissolved polyvinyl chloride. (Union Carbide's A 1100 and A 1120 silanes are suitable). The coating was sprayed on to a thickness of between 1 μm and 7 μm.

In general, the thicker the coating and the more silicon organo-functional silane present, the stronger will be the bond between the glass sheet and the polyvinyl-chloride. Precise thickness control is difficult to achieve on an industrial scale. For vehicle windshields it is desirable to have a bond strength within fairly narrow limits, high enough to resist delamination during normal use, and low enough to minimise injury in the event of an accident.

It is found easier to control the adherence by using a silicon-functional silane in admixture with the silicon organo-functional silane. For example in a solution containing 0.2% by weight of silane, the silane content may be made up of 0.05 to 0.15% A 1100 silane and 0.15 to 0.05% A 143 silane which is a chlorinated silane available from Union Carbide. This gives a peel strength in the final product of 0.5 to 1.0 kg/cm when the laminate is tested as specified.

In variants of this Example, the solvent used was (a) cyclohexanone, (b) equal volumes of cyclohexanone and dichloroethylene and (c) up to 40% by volume toluene in admixture with one of the three previously cited solvents.

EXAMPLE 6

A polyvinyl butyral layer was bonded to a glass sheet by a process as described above. In order to promote adherence between the glass and the polyvinyl butyral, the glass was first sprayed with a solution of polyvinyl butyral in ethanol containing A 1100 silane. Good results were achieved.

EXAMPLE 7

A polyurethane sheet was bonded to a glass sheet by a process as described above. In order to promote adherence between the polyurethane and the glass, the latter was first sprayed with a solution in cyclohexanone containing by weight approximately 10% polyurethane and 2% of an epoxy silane.

EXAMPLE 8

In order to avoid adherence of the exposed thermoplastic layer 3 (FIG. 1) to the moulding plate 4, the latter is coated with a silicon-functional silane which does not contain an organo-function al group. The following are examples of such silanes: A 143 chlorinated silane, propyltriethoxysilane, propyltrimethoxysilane, isopropyldimethoxyethoxysilane and n-butyl- or isobutyl- triethoxy or trimethoxy silane.

Figure 2:
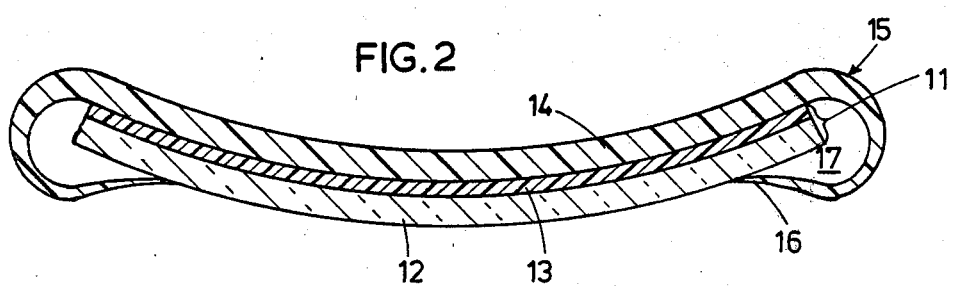
FIG. 2 shows a modification of part of the apparatus of FIG. 1.

FIG. 2 shows an alternative arrangement of laminate assembly and moulding plate. In FIG. 2, an assembly 11 comprises a curved vitreous structural ply 12 and a thermoplastic ply 13 which is to be exposed in the finished laminate. A moulding plate 14 is applied to the exposed face of the thermoplastic ply 13. As shown, the moulding plate 14 is a part of an envelope 15 having lips 16 which are sufficiently flexible that they can be brought over the edges of the assembly 11 to bear against the exposed main face of the vitreous ply 12 to define a space 17 around the edges of the assembly. The part of the envelope 15 which surrounds the edge space 17 is apertured (not shown) so that the assembly contained thereby can be degassed before it is bonded, for example as described with reference to FIG. 1. The moulding plate 14 of the envelope 15 is sufficiently hard to form a moulding surface for the exposed face of the thermoplastics ply 13, but is sufficiently flexible to accommodate tolerable variations in the curvature of successive vitreous sheets such as the sheet 12. The moulding plate 14 and the lips 16 of the envelope 15 may be integral, or they may be of different materials bonded together. The integral moulding envelope shown in FIG. 2 can be used in the performance of any of Examples 1 to 8.

Silicone resins are suitable materials for forming integral envelopes.

We claim:

1. A process of forming a multi-ply laminate which comprises at least one thermoplastic structural ply forming an outer ply of the laminate, said process comprising degassing and bonding steps during which gas is removed from between assembled structural plies of the laminate and the plies are heated to cause them to bond together while a moulding plate is in contact with the or each exposed thermoplastic ply, characterised in that during the degassing step, the assembled plies are subjected to a sub-atmospheric environmental pressure having an absolute value of 150 mm Hg or less while the inter-ply space or spaces is or are subjected to a sub-atmospheric pressure at the edges of the assembly (hereinafter called "edge pressure") to degas the assembly, said edge pressure and said environmental pressure being maintained at such values as to give rise to a separation of the plies of the assembly which is attributable to the mean inter-ply gas pressure being higher than the environmental pressure while the assembly of plies is heated to a temperature below that at which effective adherence commences between the thermoplastic material and a said adjacent ply, in that the degassed assembly remains subject to sub-atmospheric edge pressure while its temperature is increased past the temperature at which said effective adherence commences and in that the assembly is then subjected to a bonding step in which heat and pressure conditions are such as to cause the plies to bond firmly together.

2. A process according to claim 1, characterised in that while the assembly is so heated in the degassing step, said environmental pressure is or is reduced to an absolute value of 100 mm Hg or less.

3. A process according to claim 2, characterised in that while the assembly is so heated in the degassing step, said environmental pressure is or is reduced to an absolute value of 30 mm Hg or less.

4. A process according to claim 3, characterised in that while the assembly is so heated in the degassing step, said environmental pressure is or is reduced to an absolute value of 10 mm Hg or less.

5. A process according to claim 4, characterised in that while the assembly is so heated in the degassing step, said edge pressure and said environmental pressure are, or are reduced to an absolute value of 10 mm Hg or less.

6. A process according to claim 1, 2, 3, 4 or 5, characterised in that, before firm bonding takes place, said environmental pressure is released while said edge pressure remains at a sub-atmospheric level.

7. A process according to claim 6, characterised in that said environmental pressure is released when the temperature of the assembly is within 10° C. of the temperature at which effective bonding commences.

8. A process according to claim 1, 2, 3, 4 or 5, characterised in that, in said bonding step, the assembly is heated to a maximum temperature of between 20° C. and 80° C. above the temperature at which effective bonding commences.

9. A process according to claim 1, 2, 3, 4 or 5, characterised in that at least one said ply is constituted by a vitreous sheet.

10. A process according to claim 9, characterised in that the or at least one said vitreous sheet is coated prior to assembly with a primer which promotes its adhesion to the thermoplastic ply.

11. A process according to claim 10, characterised in that said primer comprises one or more silicon organo-functional silanes.

12. A process according to claim 1, 2, 3, 4 or 5, characterised in that said moulding plate is a glass sheet coated with a substance which inhibits adhesion between it and the thermoplastic ply.

13. A process according to claim 1, 2, 3, 4 or 5, characterised in that the surface of said molding plate which contacts the thermoplastic ply is smooth and nonadherent to the thermoplastic ply.

* * * * *